H. M. SCHOONMAKER.
CHEST FOR MOTOR VEHICLES.
APPLICATION FILED MAR. 12, 1921.
1,404,484.  Patented Jan. 24, 1922.
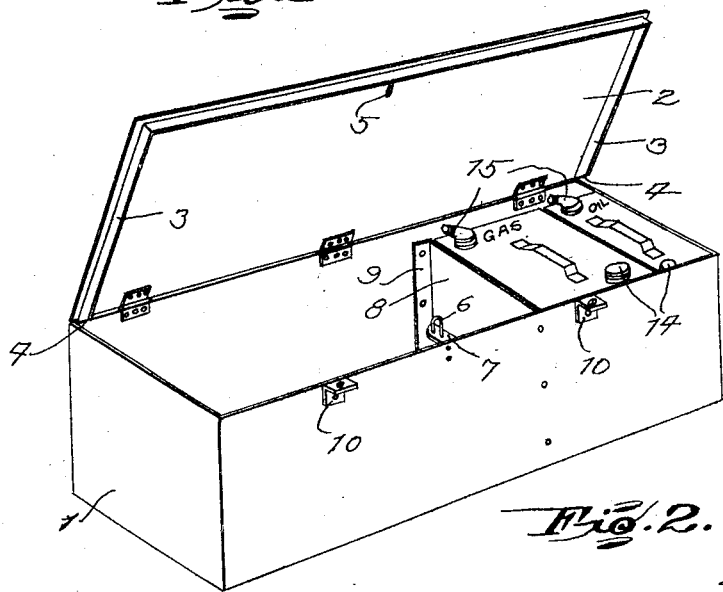
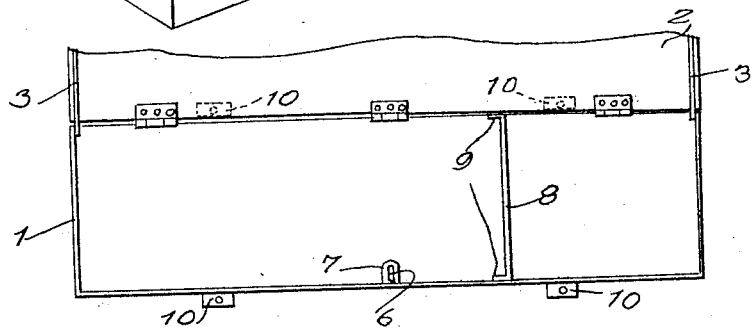
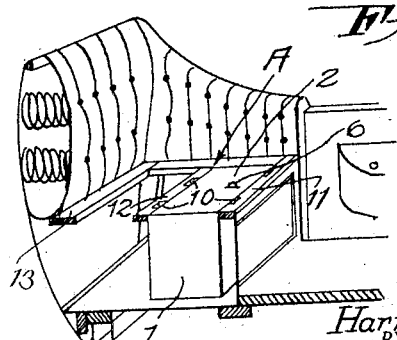
INVENTOR.
Harry M. Schoonmaker.
BY Watson E. Coleman ATTORNEY.

UNITED STATES PATENT OFFICE.

HARRY M. SCHOONMAKER, OF LEXINGTON, KENTUCKY.

CHEST FOR MOTOR VEHICLES.

1,404,484.   Specification of Letters Patent.   Patented Jan. 24, 1922.

Application filed March 12, 1921. Serial No. 451,889.

*To all whom it may concern:*

Be it known that I, HARRY M. SCHOONMAKER, a citizen of the United States, residing at Lexington, in the county of Fayette and State of Kentucky, have invented certain new and useful Improvements in Chests for Motor Vehicles, of which the following is a specification, reference being had to the accompanying drawings.

This invention relates to chests for motor vehicles and has for its object to provide a device of this character adapted to be disposed beneath the cushion of the front or driver's seat of a motor vehicle within convenient reach.

Another object is to provide a device of this character including compartments, one of said compartments being adapted to receive gasoline and oil receptacles, while the other compartment is adapted to receive tools and the like.

A still further object of the invention is to provide a device of this character wherein the lid of the chest co-operates with the seat structure to form a portion of the seat of the vehicle.

A still further object of the invention is to provide a device of this character which is supported within the frame of the seat structure between the front and intermediate rails of the frame, said chest cooperating with the seat structure to provide a compartment between the chest and the rear portion of the seat for the reception of inner tubes, curtains, etc.

With these and other objects in view the invention consists in the improved construction and arrangement of parts to be hereinafter more particularly described, fully claimed, and illustrated in the accompanying drawings, in which:

Figure 1 is a perspective view of a chest constructed in accordance with an embodiment of the invention, Figure 2 is a top plan view showing the compartments open, and Figure 3 is a sectional and perspective view of a seat structure showing the invention applied.

Referring to the drawings, 1 designates a chest or receptacle having a lid 2 which is hinged at one of its longitudinal edges to the chest, said lid being provided with a flange 3 which depends from the ends and the free longitudinal edge thereof so as to properly position the lid with respect to the chest, the edges of the flange 3 being canted as at 4 to permit uninterrupted movement of the lid when opening and closing. The lid 2 is provided with a slot 5 adapted to receive a staple 6 carried by a bracket 7, said bracket being substantially U-shaped and having one of its arms secured to the inner surface of the front wall of the chest. By this means a conventional form of lock may be engaged with the staple when desired.

A partition 8 is disposed within the box to one side of the center thereof, said partition having flanges 9 by means of which the partition is secured to the front and rear walls of the chest. This partition co-operates with the end walls of the chest to form compartments, one of said compartments being adapted to receive an oil and gasoline can or container, so as to permit a surplus or auxiliary supply of oil and gasoline to be carried in addition to the usual supply, to be used in case of emergency. The remaining compartment is adapted to receive tools and parts of the motor vehicle.

Brackets 10 are secured to the upper edges of the front and rear walls of the chest, one of the arms of each bracket extended in angular relation to the wall of the chest and adapted to be countersunk in the frame A of the seat structure. It will be noted that the frame A is composed of a front rail 11, an intermediate rail 12 and a rear rail 13, in addition to transversely extending end rails. The chest is intended to be disposed between the rails 11 and 12, the extending arms of the brackets 10 being countersunk in the upper surfaces of the rails 11 and 12 so as to permit the lid 2 to lie flush with said rails and thereby form a portion of the seat. In view of the novel construction of the lid and its hinged connection with the chest it may be readily raised and lowered without moving the chest from the seat structure. Through the co-operation of the chest an additional compartment is formed between the rails 12 and 13, the rear wall of the chest forming one wall of the compartment while the rear wall of the seat structure forms the opposite wall of the compartment. This last named compartment is intended to receive inner tubes, curtains, and like articles. In this way the heavy and sharp pointed articles such as tools and parts are separated from the fabric articles so that danger through vibration and motion received in the course of travel causing injury to these various articles is eliminated, as they are separated from each other. It will be also noted that the bottom of the chest is disposed in spaced relation to the bottom or floor of the vehicle so that rattling of the various articles within the chest is greatly decreased or eliminated, as the chest is suspended from the seat structure.

From the foregoing it will be readily seen that this invention provides a novel attachment for automobiles so arranged that alterations are not necessary in order to apply the attachment. It not only provides compartments which permit an auxiliary supply of fuel and oil to be carried but holds the receptacles containing this auxiliary supply in the proper position to prevent waste. In addition to this, it provides means whereby the fabric articles cannot possibly be damaged by the oil or steel articles, in view of the additional compartment formed through the cooperation of the rear wall of the chest and seat structure. Furthermore, when it is desired the chest may be readily removed from the seat.

The gasoline and oil cans are each provided with an inlet opening closed by means of a cap 14 and a discharge spout 15. When it is desired to discharge the contents of the can, the desired can is lifted from the compartment through the medium of the handles carried thereby. The compartment is of a size to prevent movement of the cans therein when the vehicle is in motion. The spouts 15 are disposed inwardly of the box so that they do not interfere with the closing of the cover.

What is claimed is:

1. The combination with a vehicle seat structure, of a chest having a lid, said lid forming a portion of the seat, supporting brackets carried by the chest and adapted to engage the seat structure to support the chest.

2. The combination with a vehicle seat frame, of a receptacle having a lid disposed substantially flush with the frame and co-acting therewith to form a portion of the seat, arms projecting from the upper portions of the walls of the chest and arranged to engage the seat frame.

3. The combination with a vehicle seat frame, of a chest having a lid hinged thereto, and cooperating with the frame to form a portion of the seat, arms secured to the chest adjacent the lid and extending in right angular relation to the walls of the chest, said arms being countersunk in the upper surface of the seat frame.

4. The combination with a vehicle seat structure including a seat frame, said frame having front, rear, end and intermediate rails, of a chest having a lid hinged thereto, said lid and chest being disposed between the front and intermediate rails of the seat frame, said lid forming a portion of the seat, and the rear wall of the chest cooperating with the rear portion of the seat structure to form a compartment, between the rear and intermediate rails of the seat frame.

In testimony whereof I hereunto affix my signature.

HARRY M. SCHOONMAKER.